United States Patent [19]

Sauer

[11] 4,256,449
[45] Mar. 17, 1981

[54] DRAW-FORMING OF STRETCHABLE THERMOPLASTIC MATERIAL INTO HOLLOW ARTICLES

[75] Inventor: Donald G. Sauer, Harwinton, Conn.

[73] Assignee: National Can Corporation, Chicago, Ill.

[21] Appl. No.: 62,172

[22] Filed: Jul. 30, 1979

[51] Int. Cl.³ .............................................. B29C 17/04
[52] U.S. Cl. .................................... 425/388; 264/554; 264/544; 425/324.1; 425/387.1
[58] Field of Search ..................... 425/384, 387.1, 388, 425/324.1; 264/522, 544, 554, 292

[56] References Cited

U.S. PATENT DOCUMENTS

| 2,468,697 | 4/1949 | Wiley . | |
|---|---|---|---|
| 2,983,955 | 5/1961 | Gajposik | 264/544 |
| 3,105,607 | 10/1963 | Edwards . | |
| 3,337,664 | 8/1967 | Lyon . | |
| 3,342,914 | 9/1967 | Edwards . | |
| 3,349,153 | 10/1967 | Beck | 264/544 X |
| 4,059,380 | 11/1977 | Judeis et al. | 425/388 X |

*Primary Examiner*—Jan H. Silbaugh
*Attorney, Agent, or Firm*—Robert A. Stenzel; James W. Ove, Jr.; John W. Klooster

[57] ABSTRACT

Apparatus and method for draw molding elongated hollow articles from thermoplastic material which is desirably stretch moldable plastic sheet or film. The material is draw molded on an elongated mandrel. Draw ring means are operated cooperatively with the mandrel for drawing the thermoplastic material into an elongated hollow article. Gaseous jet stream doctoring means are operated during drawing for controlling the article wall thickness. The material may be drawn through a wiper ring through which the mandrel is moved with the thermoplastic material during draw molding in combination with subjecting the outer surface of the article being drawn to the action of the doctoring jet stream from an annular orifice. Internal fluid conditioning of the mandrel, as well as alternate negative pressure within the article during molding and stripping pressure from the mandrel into the article at conclusion of molding cycle are provided for. The draw molding is effected without clamping the thermoplastic material.

20 Claims, 5 Drawing Figures

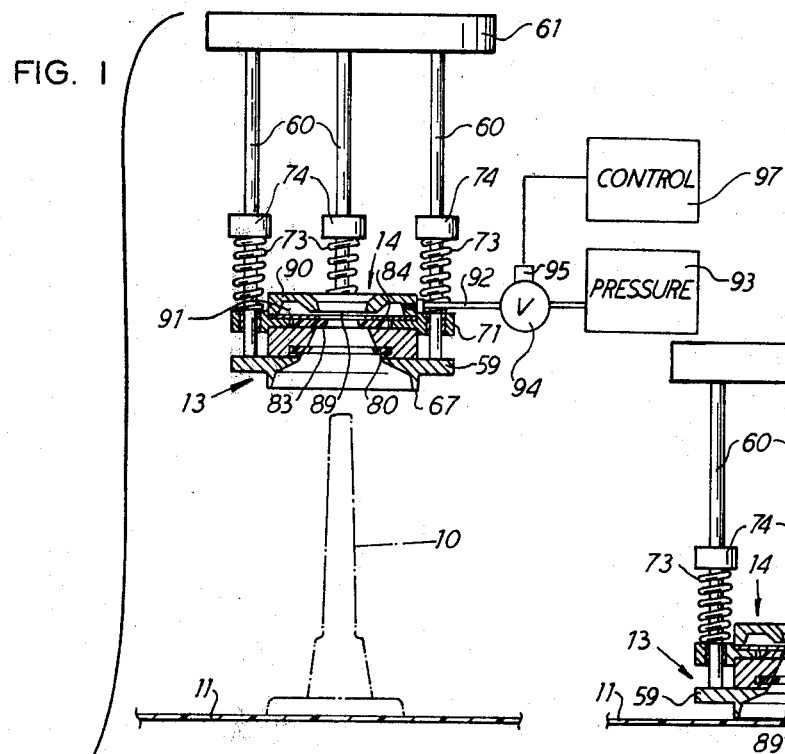
FIG. 1
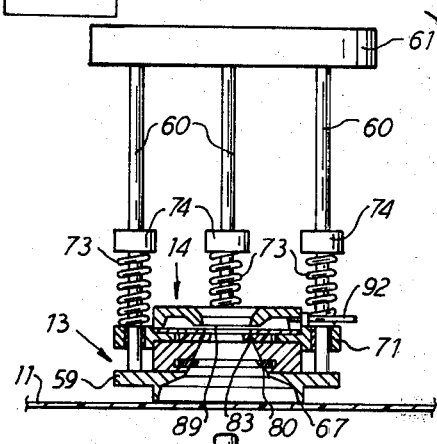
FIG. 2
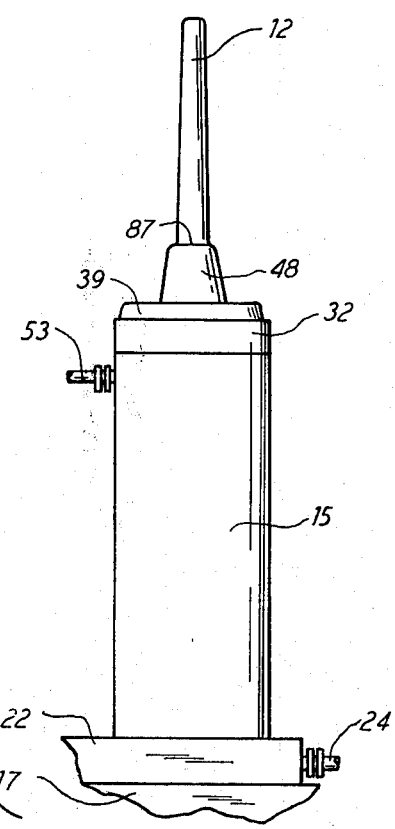
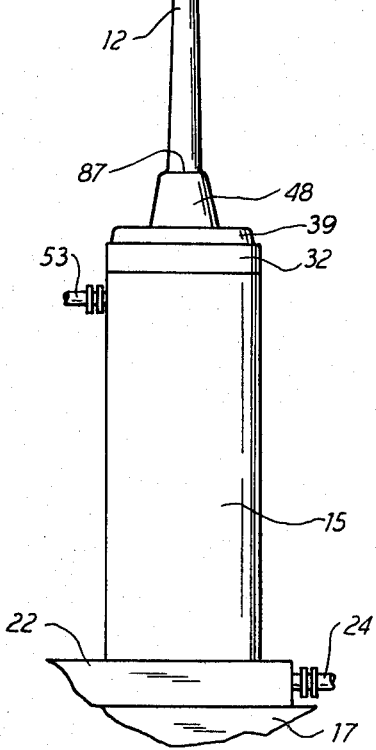

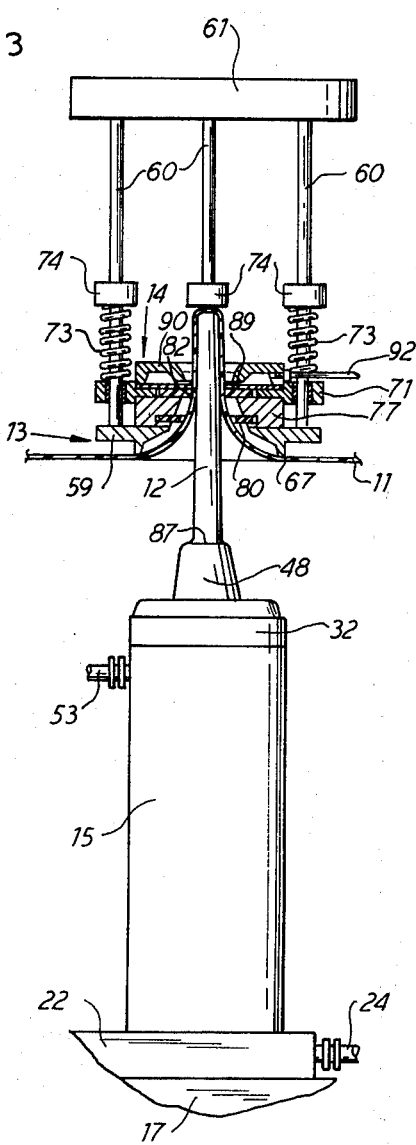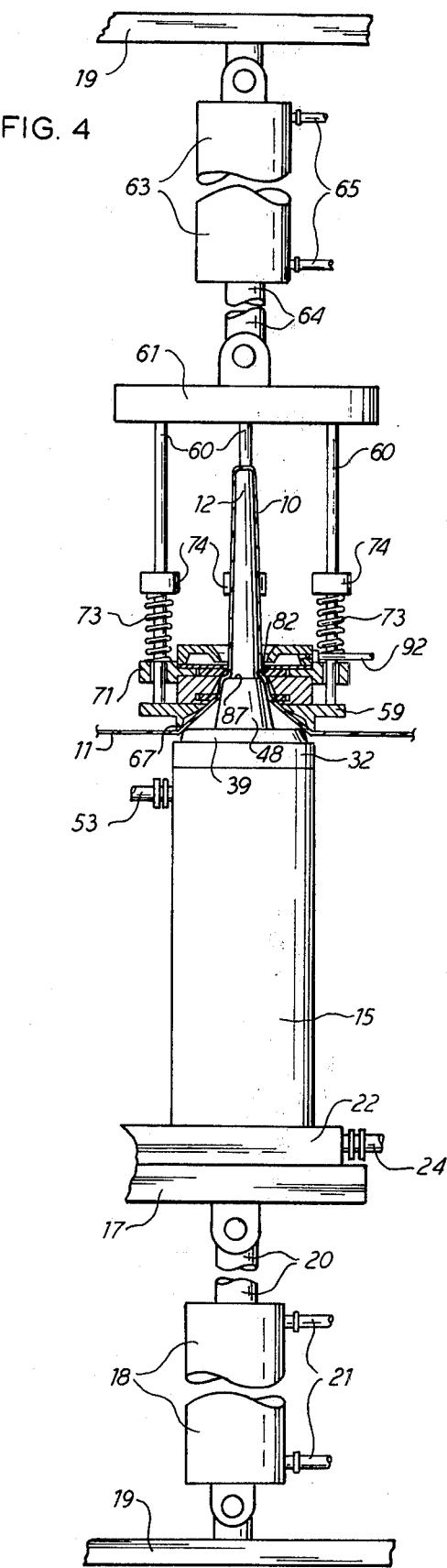

DRAW-FORMING OF STRETCHABLE THERMOPLASTIC MATERIAL INTO HOLLOW ARTICLES

BACKGROUND OF THE INVENTION

1. Field of the Invention

This invention relates to the art of producing elongated hollow articles from thermoplastic material, and is more particularly concerned with draw-molding such articles from stretchable thermoplastic sheet or film material.

2. Description of the Prior Art

Difficulty has heretofore been experienced in producing elongated articles of large length to diameter ratios from thermoplastic material, and more particularly from stretchable thermoplastic material. Especially difficult has been the attainment of desired wall thicknesses, whether such thicknesses should be uniform or of differential thickness in different areas of the wall. Wall design and quality control have been hampered.

During long length to diameter draws, the thermoplastic material tends to stretch excessively or unevenly in elongated wall portions of the hollow articles.

Thin liners of thermoplastic material (which may be multi-layered) are desirable for use in making multi-walled flow molded containers. These liners need to be produced with great uniformity with a desirable distribution of wall material within the individual liners. Liner thicknesses, from liner to liner, can vary, depending upon end use properties desired, as is appreciated in this art.

SUMMARY OF THE INVENTION

An important object of the present invention is to overcome the problems inherent in prior techniques for thermoforming articles, and to provide new and improved apparatus for and method of draw-molding elongated hollow articles from stretchable thermoplastic material.

Another object of the invention is to attain substantially accurate wall thickness control in the draw-molding of elongated articles from stretchable thermoplastic material.

A further object of the invention is to improve the efficiency, quality control and effective use of material in draw-molding elongated articles from stretchable thermoplastic material.

The invention provides apparatus for draw-molding elongated articles from stretchable thermoplastic material, comprising an elongate draw-molding mandrel, draw ring means cooperative with said mandrel for drawing said stretchable thermoplastic material into an elongated hollow article, and doctoring means operative during said drawing for controlling the article wall thickness.

Also in accordance with the principles of the invention, there is provided a method of draw-molding elongated articles from stretchable thermoplastic material, comprising cooperatively operating an elongate draw-molding mandrel and draw ring means and thereby drawing the stretchable thermoplastic material into an elongated article, and operating doctoring means during said drawing and thereby controlling the article wall thickness.

BRIEF DESCRIPTION OF THE DRAWINGS

Other objects, features and advantages of the invention will be readily apparent from the following description of a certain representative embodiment thereof, taken in conjunction with the accompanying drawings although variations and modifications may be effected without departing from the spirit and scope of the novel concepts embodied in the disclosure and in which:

FIG. 1 is a more or less schematic sectional elevational view showing apparatus embodying the invention at the beginning and/or end of a draw-molding cycle;

FIG. 2 shows the apparatus in an initial stage of a draw-molding cycle;

FIG. 3 shows the apparatus in a continuation of the draw-molding cycle;

FIG. 4 shows the apparatus at still another stage in the draw-molding cycle.

DESCRIPTION OF THE PREFERRED EMBODIMENT

Figure 5:
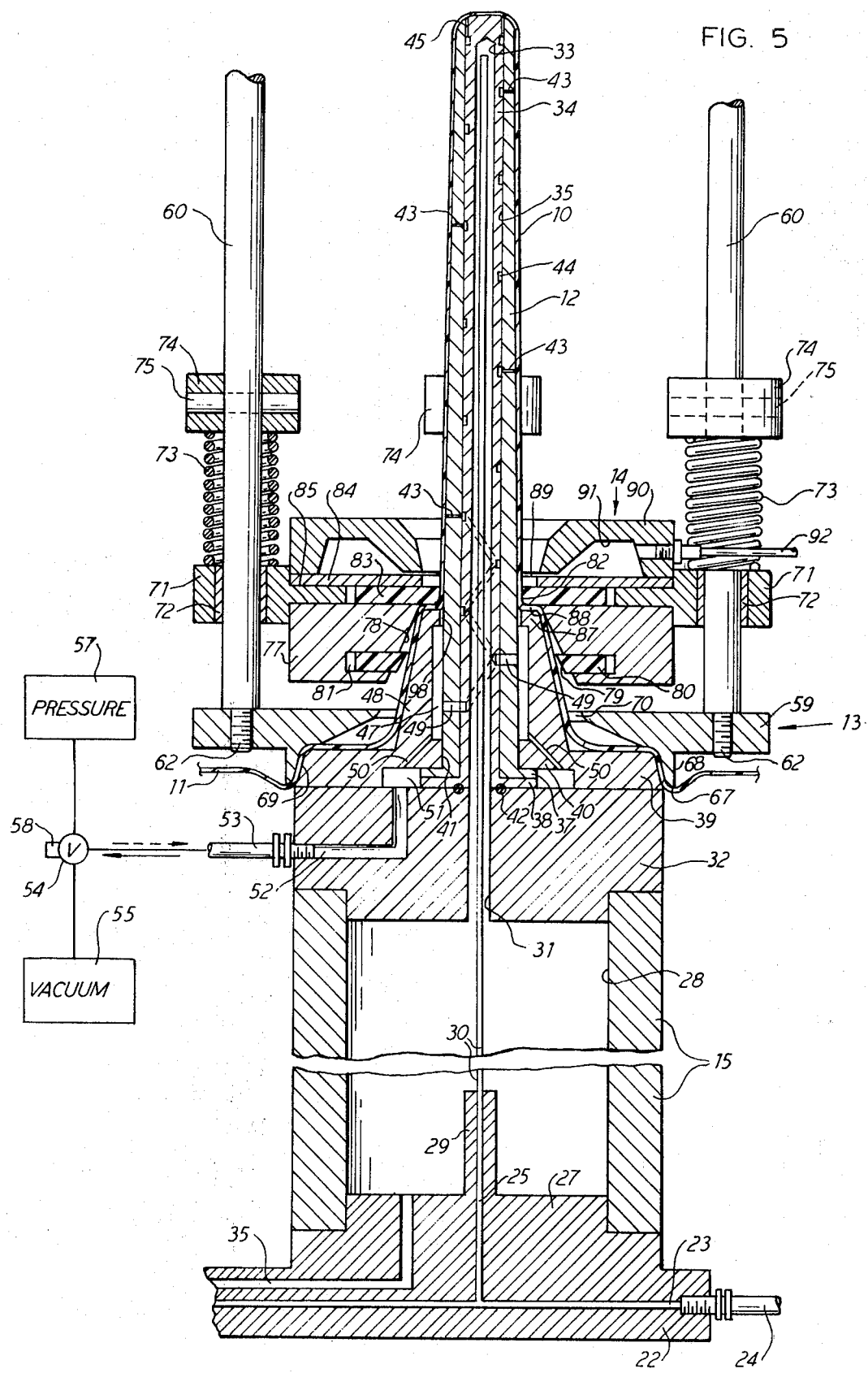
FIG. 5 is a fragmentary longitudinal sectional detail view showing the apparatus at the conclusion of the article drawing stroke in a draw-molding cycle.

In the practice of the present invention, draw-molding of elongated articles 10 (FIGS. 1 and 5) from stretchable thermoplastic sheeting material 11 comprises cooperatively operating an elongate draw molding mandrel 12 and draw ring means 13 and thereby drawing the stretchable thermoplastic material 11 into the elongated article 10. Doctoring means 14 are operated during the drawing for controlling the article wall thickness.

The thermoplastic material 11 may comprise any material which will permit draw-molding in a heated, thermoplastic state and having the particular characteristics to meet such factors as thermoplastic drawing requirements, the use to which the hollow articles are to be put, color and finish or other appearance requirements, cost considerations, and the like. Representative of thermoplastic resins which may be chosen for the present purpose are polystyrene, high-impact polystyrene, and related styrene containing polymers, polybutadiene, styrene-butadiene poly blends or copolymers, polyvinylchloride and related vinyl polymers, polyamides, polymers containing more than 50 weight percent acrylonitril, polyolefins such as polyethylene and high density polypropylene, cellulose polymers, such as ethyl cellulose, cellulose acetate, cellulose propionate, acetate polymers such as acetate butyrate, acrylic polymers such as polymethylmethacrylate, and the like.

In a preferred construction, the mandrel 12 is of elongate form and is shaped complementary to the desired shape of the article 10 and is mounted to project in axial alignment toward the cooperative draw ring means 13. To this end, the mandrel 12 is operatively mounted on one end of a tubular mount or column member 15 which is carried on means, such as a platen 17 (FIG. 4) which is adapted to be actuated reciprocably by suitable means such as a fluid operated actuator 18 of the cylinder and piston type having the cylinder attached to a machine frame 19 and a piston rod 20 attached to the platen. Operating pressure fluid, either pneumatic or hydraulic as may be preferred, is supplied for motivating the actuator 18 through ducts 21.

The construction and relationship of the mandrel 12 and the supporting column 15 is such that the assembly is adapted to comprise one unit or draw molding assembly in a gang arrangement of such assemblies in a high production draw molding machine. To this end, the column member 15 may be mounted to the platen 17 through a manifold member 22 having a manifold passage 23 to which coolant is supplied from a suitable source through a duct 24. Leading from the passage 23 is a branch passage 25 extending through a centering plug 27 projecting into the attached end of the column 15. Within a sump chamber 28 in the member 15, a hollow attachment stem 29 projecting from the plug 27 has connected therewith a small diameter coolant supply pipe 30 which extends in substantial clearance relation through a clearance bore 31 in a mounting plug 32 carried by the mandrel supporting end of the member 15. Therefrom, the coolant supply pipe 30 extends throughout substantially the length of the hollow interior of the mandrel 12 to adjacent the blind end of a coolant bore 33 provided in a liner 34 fitted within a larger bore 35 extending throughout the length of the mandrel 12. Coolant supplied by the pipe 30 enters the blind end coolant bore 33 from the inner end of the pipe and travels in reverse through the bore 33 and the bore 31 and the spent coolant is received in the chamber 28 from which it is drained off through a drain passage 35 in the manifold 22.

Attachment of the mandrel 12 and the core 34 to the column member 15 is effected through the plug 32 by means of a lateral proximal end annular radially outwardly extending attachment flange 37 on the tubular mandrel 12 lapping a subjacent annular radially outwardly extending proximal end flange 38 on the liner 34. Means comprising an annular fitting 39 secured onto the body of the plug 32 provides a clamping shoulder 40 which engages the mandrel flange 37 and clamps it and the liner flange 38 against the plug 32. An annular surface 41 above the shoulder 40 on the member 39 engages and retains the mandrel 12 in centered relation with respect to the supporting plug member 32. A static sealing ring 42 prevents leakage through the joint between the flange 38 and the member 32.

To assure firm conformance of the thermoplastic sheet or film on the molding surface of the mandrel 12 during draw molding, and subsequent efficient stripping of the molded article from the mandrel, the core member 34 is loosely slidably received within the bore 35 of the mandrel, and the mandrel is provided with an array of small diameter suction ports 43 along its length leading from its periphery into the bore 35 and communicating with a spiral distribution passage 44 in the outer perimeter of the member 34. At their distal ends, the mandrel 12 and the core member 34 desirably terminate in substantially coincident relation, and an annular passage 45 opens through the tip of the assembly and communicates with the adjacent end of the spiral passage 44. About the distal end portion of the mandrel 12, an annular vacuum/pressure chamber 47 is provided by a hollow boss extension 48 on the member 39. Communication between the chamber 47 and the spiral passage 44 is effected through ports 49 in the wall of the mandrel 12. Communication of the chamber 47 with a vacuum or pressure source is effected through ports 50 in the member 39 leading from an annular distribution chamber 51 provided in the member 39 about the perimeters of the flanges 37 and 40 and communicating by way of a passage 52 in the plug member 32 with a duct 53 which is adapted to be connected through a valve 54 with alternately a vacuum source 55 and a pressure fluid source 57. The valve 54 is adapted to be operated by a control device 58 for connecting either the vacuum source 55 or the pressure source 57 with the duct 53.

In a preferred construction, the draw ring means 13 comprises an annular disk or draw ring member 59 desirably of substantially larger diameter than the annular fitting member 39 associated with the base of the mandrel 12. At its margins, the disk 59 is fixedly attached as by means of a plurality of circumferentially spaced attaching rods 60 in sufficiently spaced relation to a platen 61 (FIGS. 1–4) to permit full reception of the mandrel 12 through the ring member 59 without engaging the platen 61. Any suitable means may be employed for fixedly securing the rods 60 to respectively the draw ring 59 and the platen 61, such as threaded terminals 62 (FIG. 5) on the rods 60.

Means are provided for actuating the platen 61 cyclically in a reciprocal path between a retracted position as shown in FIG. 1 to a protracted draw molding position as shown in FIGS. 2–5. Such actuating means may comprise a fluid operated actuator 63 (FIG. 4) of the cylinder and piston type having the cylinder connected in fixed position to the machine frame 19 and having a piston rod 64 connected to the platen 61. Pressure fluid for operating the actuator 63 may be delivered through ducts 65. It will be appreciated, of course, that both the actuator 18 for the mandrel platen 17 and the actuator 63 for the draw ring platen 61 may be connected with the same pressure fluid (pneumatic or hydraulic) source through suitable conventional control means coordinated with other operating functions of the apparatus for cyclical protraction and retraction of the platens relative to the span plane of the thermoplastic sheet 11. It will be further understood, that instead of the pressure fluid operated actuators 18 and 63, the platens 17 and 61 may be operated by suitable mechanical means.

In a preferred construction, the draw ring 59 has an annular contact limiting edge 67 on an annular flange 68 projecting toward the plastic sheet 11 to be draw molded. On its inner diameter, the ring flange 68 is substantially complementary to a shoulder 69 about the perimeter of the annular fitting member 39. Radially inwardly from the flange 68, the draw ring member or annular disk 59 diverges toward a central clearance opening 70.

In a preferred construction, the doctoring means 14 comprises an assembly which is operatively associated with the draw ring 59 and carried by the supporting rods 60. For this purpose, a carrying ring member 71 has bearing means such as bushings 72 slidably engaging the guide shafts or rods 60. The ring 71 is normally biased toward the draw ring member 59 as by means of compression springs 73 engaging between the member 71 and spring retainers 74 secured as by means of pins 75 to the rods 60.

During draw molding, doctoring means 14 cooperates with the mandrel 12 and the draw ring 59 not only to assist in the drawing elongation of the drawn area of the material 11, but also to control the wall thickness of the drawn article 10. For this purpose, the carrying ring member 71 supports in fixed relation thereto means comprising a ring shaped body 77 which is adapted to engage the confronting surface of the draw ring 59 as a stop under the bias of the springs 73. Within the member 77 is a frustoconical guide surface 78 which at its largest diameter substantially matches the diameter of the clearance opening 70 in the member 59. This diameter is large enough, so that, in at least the initial phases of draw-in of the plastic sheet material 11, the material 11 as controlled by the draw ring edge 67 will draw under tension substantially clear of the clearance opening edge 70, and the clearance opening surface 78. Then, as the drawing-in of the material 11 progresses, a tapered contact limiting edge 79 projecting symmetrically from the surface 78 opposes and may control drawing-in of the material 11. In a preferred construction, the surface 79 is formed on a so called swaging flange ring 80 made of a material such as polytetrafluoroethylene which is resistant to sticking thereto of the thermoplastic material 11, where that may be a consideration. The ring 80 is dimensioned to be received in self-adjusting centering relation in a complementary groove 81 in the member 77.

In overhanging relation to the narrowest diameter of the surface 78 is a substantially smaller diameter contact limiting wiper surface 82 which may be provided on a so called swaging flange ring 83 formed from the same inert, non-sticking material as the ring 80. A ring 83 is mounted in self-adjusting centering relation on the member 77 inside the adjacent inside diameter of the carrying ring 71 and is retained by an annular plate 84 mounted in a rabbet groove 85 in the ring 71. At its inner edge the flat washer-like plate 84 is of a large enough diameter to be in clearance relation to the edge 82.

In addition to its function as a contact limiting and wiper ring, the ring 83 is adapted to serve as a final sizing shoulder in cooperation with a sizing shoulder 87 on the distal end of the boss 48. Thereby, a radially outwardly projecting lip flange is adapted to be formed at the open end of the hollow article 10, and about which the article 10 may be circumferentially trimmed from the sheet 11 after molding has been completed.

For controlling the wall thickness of the article 10, the doctoring means 14 includes ring structure providing gaseous jet stream orifice means comprising an annular orifice 89 from which a gaseous material such as air is directed in a controlled manner, as an air knife or air doctor, against the encircled article blank 10 on the mandrel 12. In a desirable arrangement, the orifice 89 is defined between the inner margin of the ring 84 and the inner margin of a companion ring member 90 which is secured fixedly on the ring 84 within the rabbet groove 85. Within the ring member 90 is an annular air chamber 91 in communication with the orifice 89. Air or any other suitable gas or mixture of gases under pressure is delivered to the chamber 91 by means of a duct 92 (FIGS. 1 and 5) leading from a suitable source 93 communicating with the duct 92 through a control valve 94 operated as by means of a solenoid 95 controlled by suitable control means 97. Through this arrangement, excellent wall thickness control in containers of large L/D ratios, e.g. 15:1, is attained.

In a cycle of operation, starting with the mandrel 12 and its assembly aligned with the draw ring 13 and its assembly, but with the respective assemblies spaced in clearance relation to the plastic sheet 11 (FIG. 1), the platens 17 and 61 are actuated toward one another in such sequence that the draw ring edge 67 preferably reaches the sheet 11 before the tip of the mandrel reaches the sheet, substantially as shown in FIG. 2. The sheet 11 is preferably preheated by subjecting it to suitable heating means such as infrared or other heating devices commonly used for heating purposes. In such case, although the thermoplastic sheet 11 may be marginally supported in a span plane between the cooperating draw-molding assemblies, it may be necessary to take up slack, that is, tension the area of the sheet to be draw molded, and, in such case, the edge 67 may be thrust through the span plane of the sheet 11 a limited distance, such as indicated in FIG. 5. On the other hand, where the sheet 11 is not preheated, but is heated to desirable thermoplastic state on engagement within the draw-molding apparatus, such thrusting of the edge 67 through the span plane of the sheet may not be desired, and the leading edge 67 may then be halted just as it reaches the sheet 11 or even shortly before the edge 67 reaches the sheet 11. As the leading or draw edge 67 is halted in draw-molding position, the mandrel 12 is caused to advance on through the draw ring means 13 as shown, for example, in FIG. 3, wherein the material engaged by the mandrel 12 is thrust on through the draw ring means 13 and the doctoring means 14. As the draw-molding progresses, the wiper ring edge 82 assures that the plastic material being drawn by the mandrel 12 will be draped close to the mandrel surface, so that negative or vacuum pressure within the mandrel will cause the plastic material to be drawn into intimate overall engagement with the molding surface of the mandrel 12 as the draw molding progresses. During the draw-molding progression of the mandrel 12, conditioning fluid is circulated through the interior of the mandrel 12 and the core member 34, both of which are formed from heat transfer material. Also, as the draw molding action of the mandrel 12 progresses, the wall of the article 10 being formed is subjected to the action of the air knife or doctoring annular jet directed against the plastic article blank from the doctor orifice 89. By controlling the temperature and/or velocity of the air, any desired conditioning result attainable by means of the doctoring air stream will be effected. For example, where the material of the plastic sheet 11 has been preheated to substantial thermoplasticity, there may be tendency for the article wall as formed on the mandrel 12 to be stretched too thin. However, by impinging the article wall as it is being formed by air of temperature selectively cooler than the outer surface temperature of the plastic material on the mandrel, the quenching effect of the cooler fluid sufficiently stiffens the plastic material to resist overstretching, and where desired, results in substantially uniform article wall thickness. Another benefit of this fluid doctoring resides in more efficient material utilization, because more material is drawn into the shaped article 10, and thus less material left in the scrap, which must eventually be trimmed off when the article 10 is removed from the sheet 11.

Complementary or alternative to controlling of the article wall by fluid doctoring through the orifice 89, the rate of travel of the mandrel 12 may be controlled, and the temperature of the coolant supplied internally of the mandrel 12 may be controlled. In other words, the chilling effect of the ambient air, and/or of the annular doctoring air jet, and the speed at which the mandrel 12 is driven in the draw molding stroke are all variables that can be controlled to attain desirable article wall thicknesses.

Where it is desired to vary the wall thickness in different areas or portions of the article being draw molded, the drawing stroke speed of the mandrel 12 may be appropriately varied while the doctoring jet stream from the orifice 89 continues at uniform temperature and velocity. For example, where it is desired to have a thicker wall section in the closed end of the article 10 than in the longitudinal wall section, the mandrel 12 may be operated to enter the preheated thermoplastic sheet 11 at a relatively slow speed during the closed end formation of the article, and the speed of the mandrel then progressively or abruptly accelerated, depending upon whether an abrupt or gradual transition to thinner wall section is desired.

Although in the illustrated example, the article 10 has a generally test tube like configuration, it will be appreciated that other desirable configurations or shapes may be draw-molded, such as various bottle shapes, in which it may be desirable to effectively control wall thicknesses to be either substantially uniform throughout the article or varied in a certain area or areas. These results can be readily attained by the present invention substantially as described.

Because numerous variables during the draw-molding process are separately and relatively controllable, a wide range of thermoplastic materials may be draw-molded in accordance with the principles of the present invention. Numerous and varied draw molding characteristics and limitations in the various thermoplastic materials can be readily accommodated.

If desired, instead of preheating the thermoplastic sheet material 11, the thermoplastic softening may be effected on the mandrel 12 itself. For example, the conditioning fluid to the interior of the mandrel, may be of sufficiently elevated temperature to at least soften or initiate thermoplasticizing the material on contact, and then the temperature of the doctoring jet stream from the orifice 89 may be so temperature conditioned, e.g. heated, as to attain a substantially uniform interior and exterior temperature in the wall of the article being molded, or even a suitable differential temperature, to attain the desired wall thickness or area wall thicknesses desired in the finished article 10.

At the conclusion of the draw-molding stroke of the mandrel 12, the shoulder 87 adjacent to the base portion of the mandrel thrusts toward and clamps the mouth flange portion 88 of the container blank against the wiper and sizing ring 83. To assure thorough sizing compression force between the shoulder 87 and the opposing surface of the ring 83, the mandrel assembly is desirably driven at least a short distance in opposition to the bias of the srings 73 to the extent that the doctoring means assembly 14 may be lifted away from the draw ring 59, substantially as shown in FIG. 5, as compared with FIG. 4, by way of example. This completes draw molding of the article 10.

At completion of the draw molding phase of the drawing cycle, the draw ring and doctoring means assembly 13,14 is retracted, as is also the mandrel 12 and its associated assembly toward the relative separated positions shown in FIG. 1. For stripping the article 10 from the mandrel 12, the fluid distribution system within the mandrel supplied through the duct 53 is supplied with pressure fluid such as compressed air. The finished article 10 is thus left with the thermoplastic sheet 11, substantially as shown in dash outline in FIG. 1, and removed from the draw-molding zone or station by incremental advance of the sheet 11 to bring the next succeeding area of the sheet into position for draw-molding in the next succeeding draw-molding cycle of the apparatus. It will be appreciated, of course, that the draw-molding cycles of operation of the apparatus may be initiated and controlled manually, or, as is generally preferred, automatically and repetitively for high production purposes.

Another desirable feature of the draw-molding apparatus described resides in that it is substantially clamp free. It will be observed that by virtue of the efficient cooperation of the mandrel and draw ring assemblies, the sheet thermoplastic material is uniformly and effectively drawn into the draw ring and doctoring means assembly entirely free from any clamping coaction of parts, and the only time that any clamping or compressing may be desired is at the final instant of the draw forming stroke when it may be desirable to finally size the lateral mouth flange 88 about the mouth end of the article 10 and which will already have been formed against the shoulder 87 by reason of the in-drawing effect of negative pressure or vacuum effective through an annular gap 98 between the shoulder 87 and the body of the mandrel 12 and communicating with the fluid chamber 47. Therefore, if sizing of the flange 88 is not deemed necessary, even the sizing clamping step effected between the shoulder 87 and the ring 83 may be omitted. The particular location of the annular gap port 98 also substantially assists in the final stripping action of pressure fluid exerted therethrough from the chamber 47.

It may be noted, further, that the apparatus and method of the present invention avoids any need for cavitated mold means. The draw ring means 13 and companion doctoring means 14 are openly supported by the rod shafts 60. It may further be noted that although the apparatus has been shown as vertically oriented, a tilted or horizontal orientation may be preferred.

It will be understood that variations and modifications may be effected without departing from the spirit and scope of the novel concepts of this invention.

I claim as my invention:

1. Apparatus for forming mechanically and pneumatically a thin walled hollow article from a stretchable thermoplastic sheeting member comprising:

(A) a die set comprising a male forming die means and a cooperating female forming die means, said male die means and said female die means being relatively reciprocating along an axis, (B) said female die means including a draw ring means and an opening defined through said female die means and drawn ring means, (C) sheeting positioning means disposed adjacent said opening at one side of said female die means for positioning said sheeting means across said opening between said male die means and said female die means when said die means and said female die means are in a relatively disengaged relationship, (D) said male die means including an elongated mandrel means which is adapted to register with and project through said opening and thus through said female die means and draw ring means, (E) a housing means disposed in axially spaced adjacent relationship to said female die means on that side thereof opposed to the side thereof which is adjacent said sheeting positioning means, said housing means having an aperture defined therethrough, said mandrel means being adapted to project through said aperture and thus through said housing and said housing means including a gas conducting passageway means defined therein terminating in a circumferentially extending, generally radially inwardly directed nozzle means on said aperture for directing an axially localized gas stream against said sheeting over said male die means in an article forming operation, said aperture being in radially spaced relationship to said sheeting, (F) said mandrel means including a first conduit means defined therein for circulating a thermally conditioning fluid therethrough and also second conduit means for establishing a negative pressure within an article being formed over said mandrel means during an article forming operation for conforming said article over adjacent surface portions of said mandrel means.

2. The apparatus of claim 1, including means for effecting a vacuum in said second conduit means during an article forming operation, and means for alternatively effecting an article stripping positive pressure in said second conduit means for removing a formed article from said mandrel means at the conclusion of an article forming operation.

3. The apparatus of claim 1, including means cooperatively related to said mandrel means for forming a mouth end flange on said article being formed on said mandrel means.

4. The apparatus of claim 1 wherein said sheeting positioning means is provided by a flange means located adjacent said opening in association with said female die means, and said flange means extends axially towards said male die means when said male die means and said female die means are in relatively disengaged relationship, and said flange means terminates in a sheet bearing surface configuration.

5. The apparatus of claim 1 wherein said housing means and said female die means are supported by a plurality of circumferentially spaced axially extending rod means.

6. The apparatus of claim 5, including means connecting ends of said rod means to said female forming die means, and said housing means includes a member supportingly guided by said rods for limited relative reciprocal movements of said housing means.

7. The apparatus of claim 6, including means normally yieldably biasing said housing means toward said femal forming die means.

8. The apparatus of claim 1 wherein said housing means is additionally provided with a swaging flange means coaxially located between said female die means and said housing means in self-adjusting centering relationship relative to said axis in complimentary groove means defined in said housing means for limiting contact between said housing means and said sheeting during an article forming operation.

9. The apparatus of claim 8, wherein said swaging flange means is comprised of a material which is non-sticking with respect to thermoplastic material to be formed.

10. The apparatus of claim 8 wherein a second swaging flange means is axially interposed between said swaging flange means and said female die means and said second swaging flange means is associated with said housing means and is located in self-adjusting centering relationship relative to said axis in a second complementary groove means defined in said housing means for limiting contact between an article being formed and said housing means during an article forming operation.

11. The apparatus of claim 1 further provided with means for relatively reciprocating said male die means and said female die means along said axis.

12. The apparatus of claim 1, wherein said nozzle means includes pressurizing gas means interconnected with said gas conducting passageway means for supplying said nozzle means with conditioning gas under pressure to issue as an annular jet stream onto the outer surface of an article being formed on said mandrel means.

13. The apparatus of claim 1 further including male die drive means.

14. The apparatus of claim 1 further including gas stream supply means associated with said gas conducting passageway means.

15. The apparatus of claim 14 further including valve means for regulating the pressure of said gas stream.

16. The apparatus of claim 15 further including control means for regulating said valve to achieve a predetermined wall thickness in said thin walled hollow article.

17. The apparatus of claim 15 further including temperature control means for said gas stream.

18. The apparatus of claim 1 further including valve means associated with said second conduit means for regulating pressure in said second conduit means, and negative pressure supply means associated with said valve means.

19. The apparatus of claim 18 further including control means for said valve means to change pressure in said second conduit means.

20. The apparatus of claim 1 further including temperature control means for said fluid circulating through said first conduit means.

* * * * *